(12) United States Patent
Ji et al.

(10) Patent No.: US 12,552,496 B2
(45) Date of Patent: Feb. 17, 2026

(54) WIND-WAVE-RESISTANT FLOATING OFFSHORE PHOTOVOLTAIC DEVICE

(71) Applicant: JIANGSU UNIVERSITY OF SCIENCE AND TECHNOLOGY, Zhenjiang (CN)

(72) Inventors: Chunyan Ji, Zhenjiang (CN); Yong Cheng, Zhenjiang (CN)

(73) Assignee: JIANGSU UNIVERSITY OF SCIENCE AND TECHNOLOGY, Zhenijiang (CN)

( * ) Notice: Subject to any disclaimer, the term of this patent is extended or adjusted under 35 U.S.C. 154(b) by 467 days.

(21) Appl. No.: 18/125,782

(22) Filed: Mar. 24, 2023

(65) Prior Publication Data
US 2023/0227125 A1    Jul. 20, 2023

(30) Foreign Application Priority Data
Apr. 7, 2022   (CN) .......................... 202210358993.4

(51) Int. Cl.
| | |
|---|---|
| B63B 1/14 | (2006.01) |
| B63B 1/40 | (2006.01) |
| B63B 21/20 | (2006.01) |
| B63B 21/50 | (2006.01) |
| B63B 35/44 | (2006.01) |
| F24S 25/16 | (2018.01) |
| H02S 20/00 | (2014.01) |

(52) U.S. Cl.
CPC .................. *B63B 1/40* (2013.01); *B63B 1/14* (2013.01); *B63B 21/20* (2013.01); *B63B 21/50* (2013.01); *B63B 35/44* (2013.01); *F24S 25/16* (2018.05); *H02S 20/00* (2013.01); *B63B 2021/203* (2013.01); *B63B 2035/4453* (2013.01)

(58) Field of Classification Search
CPC .. B63B 1/40; B63B 1/14; B63B 35/44; B63B 21/20; B63B 21/50; F24S 25/16
See application file for complete search history.

(56) References Cited

U.S. PATENT DOCUMENTS 5,529,012 A * 6/1996 Rytand ...................... B63C 1/02
  114/263
5,951,785 A * 9/1999 Uchihashi ............... H10F 77/68
  136/246

(Continued)

FOREIGN PATENT DOCUMENTS

| CN | 120263036 A | * | 7/2025 | ............. F03B 13/14 |
|---|---|---|---|---|
| UA | 126062 C2 | * | 8/2022 | ........... H02S 40/425 |
| WO | WO-2018026930 A1 | * | 2/2018 | ............. F03B 13/20 |

*Primary Examiner* — S. Joseph Morano
*Assistant Examiner* — Jovon E Hayes
(74) *Attorney, Agent, or Firm* — CBM PATENT CONSULTING, LLC

(57) ABSTRACT

A wind-wave-resistant floating offshore photovoltaic device includes a photovoltaic array and a mooring unit; the mooring unit used for limiting the position of the photovoltaic array is arranged on two sides and the head of the photovoltaic array, the photovoltaic array includes a breaking-wave base device arranged on a wave facing face, resonance wave absorbing floating body units arranged in a middle and common floating body units arranged on a wave shielding face, and the whole formed by connecting the plurality of resonance wave absorbing floating body units is connected to the breaking-wave base device by means of rubber ring type connectors.

11 Claims, 4 Drawing Sheets

(56) References Cited

U.S. PATENT DOCUMENTS

| | | | | |
|---|---|---|---|---|
| 6,534,703 B2* | 3/2003 | Dinwoodie | ............ | H02S 40/36 |
| | | | | 136/246 |
| 9,184,693 B2* | 11/2015 | Yun | ............ | H02S 20/00 |
| 10,097,131 B2* | 10/2018 | Momayez | ............ | H02S 10/40 |
| 10,179,630 B2* | 1/2019 | Wee | ............ | B63B 17/02 |
| 10,286,984 B2* | 5/2019 | Seravalli | ............ | B63B 35/44 |
| 10,396,703 B2* | 8/2019 | Niimi | ............ | H02S 10/40 |
| 10,486,782 B2* | 11/2019 | Chang | ............ | B63B 43/02 |
| 10,644,645 B2* | 5/2020 | Bjørneklett | ............ | F24S 20/70 |
| 10,752,325 B2* | 8/2020 | Niimi | ............ | F24S 25/11 |
| 10,784,814 B2* | 9/2020 | Wang | ............ | F24S 25/65 |
| 11,332,223 B2* | 5/2022 | Van Hoeken | ............ | B63B 35/44 |
| 2013/0146127 A1* | 6/2013 | Lunoe | ............ | F24S 20/70 |
| | | | | 136/251 |
| 2014/0224165 A1* | 8/2014 | Veloso | ............ | F24S 20/70 |
| | | | | 114/267 |
| 2019/0131919 A1* | 5/2019 | Bjørneklett | ............ | H02S 30/10 |

* cited by examiner

WIND-WAVE-RESISTANT FLOATING OFFSHORE PHOTOVOLTAIC DEVICE

CROSS-REFERENCE TO RELATED APPLICATIONS

This application claims priority to Chinese Patent Application Ser. No. CN202210358993.4 filed on 7 Apr. 2022.

TECHNICAL FIELD

The present invention relates to the technical field of offshore photovoltaic power generation platforms, and in particular to a wind-wave-resistant floating offshore photovoltaic device.

BACKGROUND ART

As various fossil energy sources are increasingly exhausted because of continuous exploitation by human beings, various renewable energy sources are urgently needed. Due to the superiority, solar power generation occupies the leading position in world energy consumption. Since offshore photovoltaic power generation has a lot of advantages such as saving land resources, avoiding excessive influence on a water supply ecological environment, being short in mounting period, high mounting efficiency, less in surface dust coverage, high in power generation efficiency, etc., the offshore photovoltaic power generation has a good development prospect and has gradually become a key point of research in recent years so as to be promoted better.

In the process of offshore photovoltaic power generation technology promotion, wind waves become a first barrier for hindering the development thereof. In China, the first offshore floating photovoltaic power station completes an empirical test in Hainan, and can resist the maximum wave height of 1.61 m, such that the anti-typhoon problem of the floating photovoltaic power generation of an open water area in deep and far sea becomes the key field of research. In the prior art, for most offshore photovoltaic power stations, wave resistance is improved by strengthening the structures of such power stations or by reducing impacts of sea waves, such as the Chinese invention patent with No. CN201910818044.8, in which a floating offshore photovoltaic power generation platform is disclosed and which also mentions a stormy wave resistance effect. However, the invention improves the wind wave resistance only by means of flexible connection and by reducing a shading area of floaters in a wave area, which fails to effectively avoid shaking on the platform of wind waves and impacts on the structure caused by the wind waves under terrible sea conditions.

SUMMARY

Invention objective: an objective of the present invention is to provide a wind-wave-resistant floating offshore photovoltaic device, which may resist wind waves better, thereby achieving reliable and efficient power generation.

Technical solution: the wind-wave-resistant floating offshore photovoltaic device mentioned in the present invention includes a photovoltaic array and a mooring unit, where the mooring unit used for limiting the position of the photovoltaic array is arranged on two sides and the head of the photovoltaic array, and the photovoltaic array includes a breaking-wave base device, resonance wave absorbing body units and common floating body units. The whole formed by connecting the plurality of resonance wave absorbing floating body units is connected to the breaking-wave base device, the whole formed by connecting the plurality of common floating body units is connected to the whole formed by connecting the plurality of resonance wave absorbing floating body units, the breaking-wave base device is connected to the whole formed by connecting the plurality of resonance wave absorbing floating body units by means of rubber ring type connectors, and front and rear rows of resonance wave absorbing floating body units in the whole formed by the plurality of resonance wave absorbing floating body units are connected by means of universal joint type connectors.

Preferably, the breaking-wave base device includes a guided wave crushing type breaking-wave base device arranged at a front end and a common wave dissipating floating body arranged at a rear end, and the common wave dissipating floating body is connected to the resonance wave dissipating floating body units by means of a plurality of rubber ring type connectors.

Preferably, a plurality of anti-collision gaskets used for preventing collision between the breaking-wave base device and the resonance wave absorbing floating body units are further arranged on an end face of the common wave dissipating floating body.

Preferably, the rubber ring type connector includes a rubber ring, ropes and a mooring pile, the mooring pile is mounted on the end face of the common wave dissipating floating body, one end of the rubber ring is connected to the mooring pile by means of at least two ropes, and the other end of the rubber ring is connected to the resonance wave dissipating floating body unit by means of at least two ropes.

Preferably, the resonance wave absorbing floating body unit includes a floating body module I, an umbrella-shaped photovoltaic support, a stand column and a photovoltaic panel, the stand column is arranged on the floating body module I, the umbrella-shaped photovoltaic support is arranged at an upper end of the stand column, and the photovoltaic panel is linked to the umbrella-shaped photovoltaic support.

By using the umbrella-shaped photovoltaic support, damage to the photovoltaic panel caused by deformation of the floating body module I under sea waves or impacts may be avoided.

The floating body module I includes walkway floating bodies I, walkway floating bodies II and a rectangular floating body, two ends of the rectangular floating body are connected to the walkway floating bodies I respectively at the two ends by means of the walkway floating bodies II, the walkway floating bodies I are longer than any side of the rectangular floating body and are longer than the walkway floating bodies II, and the walkway floating bodies I arranged at the two ends of the rectangular floating body are connected by means of a plurality of walkway floating bodies II connected together.

In such a connection manner, narrow slits with different widths may be spliced on each floating body module I, and the narrow slits with different widths resonate under waves in different periods, thereby further weakening the waves.

A connecting pipe is arranged in the floating body module I, and the connecting pipe penetrates the rectangular floating body and is connected to the walkway floating bodies II.

Preferably, each floating body module I is provided with a bayonet, all the floating body modules are spliced together by means of the bayonets, and plastic screws are used for achieving fixing between the walkway floating bodies I and the walkway floating bodies II, and fixing between the walkway floating bodies II and the rectangular floating body in the floating body module I.

Preferably, the stand column and the umbrella-shaped photovoltaic support are connected by using a hinged structure.

The hinged structure facilitates adjustment of an angle of the photovoltaic panel as required so as to achieve the maximum power generation efficiency.

Preferably, distances between the walkway floating bodies I, the walkway floating bodies II and the rectangular floating body are adjusted within the range of an arranged sea area wave axis to form an array type narrow slit structure.

When waves enter narrow slits, the array type narrow slit structure induces water in the narrow slits to generate piston-type up-and-down oscillation motion, such that an interference resonance phenomenon is generated, partial wave energy is dissipated, a transmitted wave height of the wave shielding face is further reduced, and an operable condition for a common photovoltaic device is provided.

Preferably, the universal joint type connector is connected to the connecting pipe and includes a connection head, a universal joint and an elastic rubber sleeve, where the connection head is connected to the connecting pipe by means of a fixing pin, the universal joint is connected to the connection head, and a periphery of the universal joint is provided with the elastic rubber sleeve in a sleeving manner, which may protect the connecting structure from being corroded by seawater and has a good anti-collision effect.

The front and rear adjacent resonance wave absorbing floating body units are flexibly connected by means of the universal joints, such that the degree of freedom of the previous floating body module may be released, and stress of the floating body module is reduced.

Preferably, the common floating body unit includes a floating body module II, a common mounting support and a photovoltaic panel, compared with the floating body module I, a connecting pipe for improving the overall structural strength is omitted in the floating body module II, the remaining structures are the same as those of the floating module I, and the photovoltaic panel is mounted on the floating body module II by means of the common mounting support.

Since the common floating body units are positioned at a rear portion of the whole device, waves faced by the common floating body units are reduced, and therefore, the connecting pipe for strengthening the structure is omitted. The common floating body units are also directly connected together without connectors. Moreover, since the waves at the rear portion are further attenuated, umbrella-shaped mounting supports are not used for mounting of the photovoltaic panels on the common floating body units, and common mounting supports are used, such that the cost is low, and mounting is fast.

Preferably, the plurality of common floating body units are directly spliced.

Beneficial Effects:
(1) According to the present invention, the breaking-wave base device is arranged on the wave facing face of the floating photovoltaic array, such that the defect that floating photovoltaic power generation has high requirements on sea conditions is overcome. Good wave absorbing performance of the breaking-wave base device is utilized to resist impacts of sea waves and weaken sea wave energy, a plurality of common wave dissipating floating bodies may be connected behind the breaking-wave base device, and the number of common wave dissipating floating bodies behind may be arbitrarily increased or reduced according to the sea conditions.

(2) The photovoltaic array units of the present invention are connected together by means of module splicing. Each module has a designed bayonet, which may be conveniently and quickly spliced together to be fixed by the plastic screws without being corroded by seawater, and facilitates construction and maintenance. On the basis of the convenient connection manner, the narrow slits with different widths may be spliced on each floating body module, and the narrow slits with different widths resonate under waves in different periods, such that the wave energy is further dissipated, the wave force is weakened, and the transmitted wave height of the wave shielding face is reduced. Each resonance wave absorbing floating body unit is flexibly connected by using the universal joints, such that the degree of freedom of the previous resonance wave absorbing floating body unit may be released, thereby reducing the stress of the resonance wave absorbing floating body unit.

(3) In the present invention, the supports for supporting the photovoltaic panels on the resonance wave absorbing floating body units are of umbrella-shaped supporting structures, and a force bearing point on the rectangular floating body is only one, such that when the floating bodies deform under sea waves or impacts, the photovoltaic panels may be prevented from being stretched and damaged, and the angles of the photovoltaic panels are also convenient to adjust.

DETAILED DESCRIPTION OF THE EMBODIMENTS

The present invention will be further described below with reference to the accompanying drawings.

The technical solutions in the examples of the present invention will be clearly and completely described below with reference to the accompanying drawings in the examples of the present invention. Obviously, the described examples are merely some examples rather than all examples of the present invention. All other examples obtained by those of ordinary skill in the art based on the examples of the present invention without creative efforts shall fall within the protection scope of the present invention.

It needs to be noted that on the examples in the present invention and features in the examples can be combined with each other without conflict.

Figure 1:
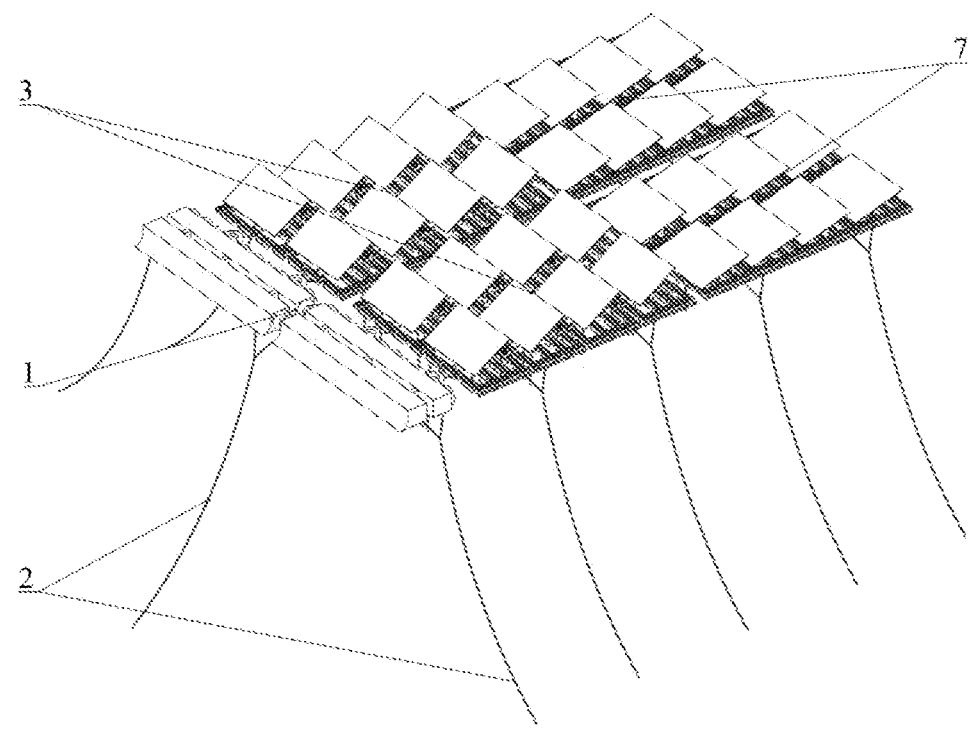
FIG. 1 is an axial diagram of an integral structure of the present invention.
Figure 2:
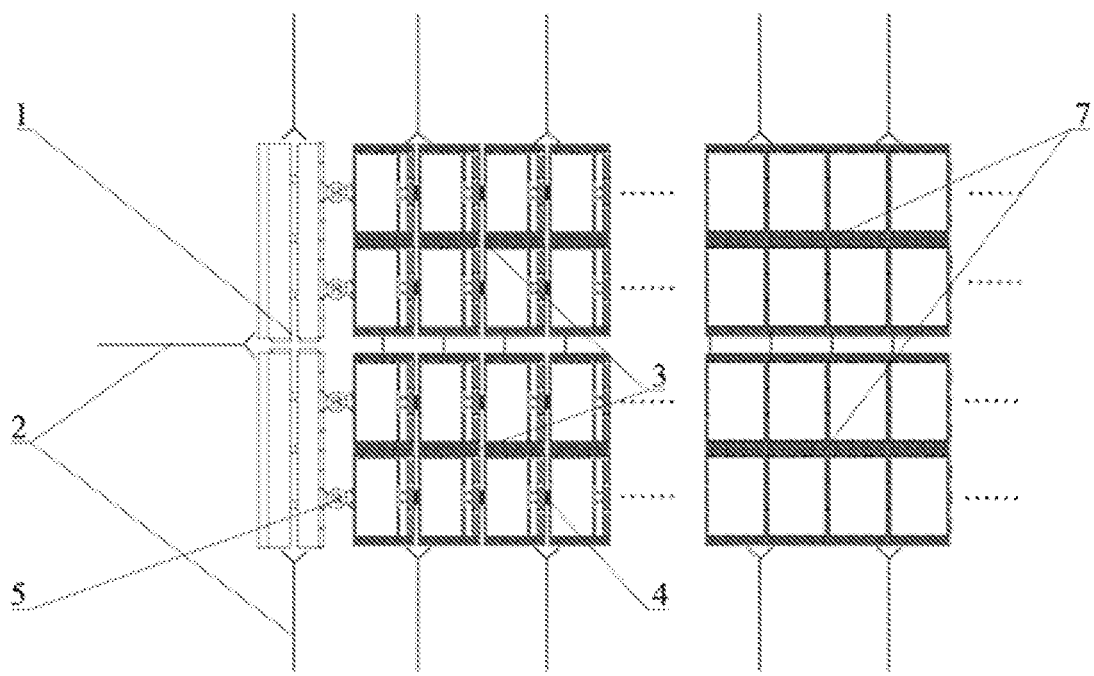
FIG. 2 is a top view of an integral structure of the present invention.

With reference to FIG. 1 and FIG. 2, the present invention includes a photovoltaic array and a mooring unit 2, where the mooring unit 2 used for limiting the position of the photovoltaic array is arranged on two sides and the head of the photovoltaic array, and the photovoltaic array includes a breaking-wave base device 1, resonance wave absorbing floating body units 3 and common floating body units 7. The whole formed by connecting the plurality of resonance wave absorbing floating body units 3 is connected to the breaking-wave base device 1, the whole formed by connecting the plurality of common floating body units 7 is connected to the whole formed by connecting the plurality of resonance wave absorbing floating body units 3, the breaking-wave base device 1 is connected to the whole formed by connecting the plurality of resonance wave absorbing floating body units 3 by means of rubber ring type connectors 5, and front and rear rows of resonance wave absorbing floating body units 3 in the whole formed by the plurality of resonance wave absorbing floating body units 3 are connected by means of universal joint type connectors 4.

Figure 3:
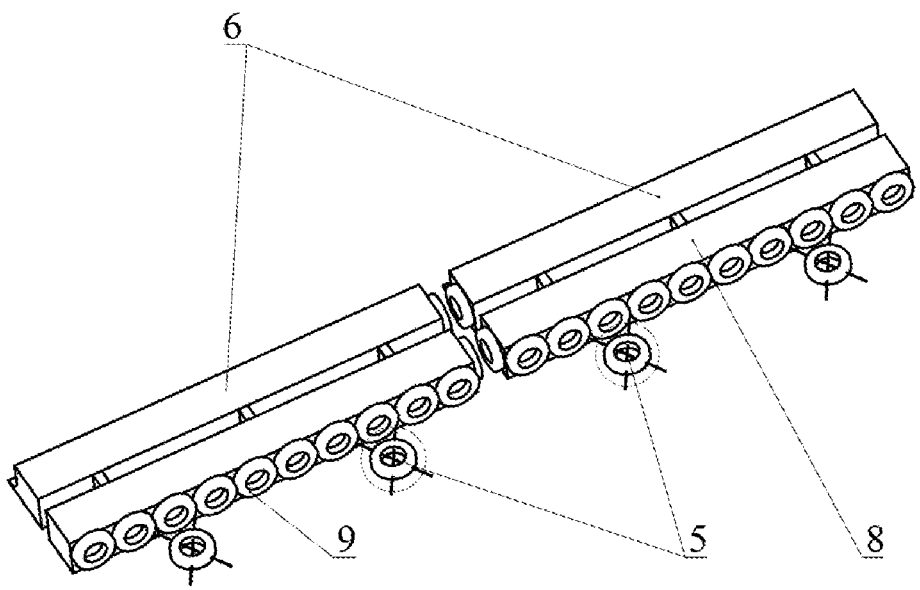
FIG. 3 is an axial diagram of a wave absorbing device of the present invention.

With reference to FIG. 3, the breaking-wave base device 1 is composed of a front guided wave crushing type breaking-wave base device 6 and a rear common wave dissipating floating body 8, is arranged at the foremost end of the wave facing face of the whole structure, bears impacts of sea waves, and weakens the sea waves. A wave guide plate in the front of the breaking-wave base device 6 may guide the sea waves to be ejected upwards, thereby dissipating energy of the sea waves. When sea conditions are relatively harsh, the rear common wave dissipating floating body 8 may be increased so as to improve wave absorbing capacity. A plurality of anti-collision gaskets 9 used for preventing collision between the breaking-wave base device 1 and the resonance wave absorbing floating body units 7 are further arranged on an end face of the common wave dissipating floating body 8.

Figure 4:
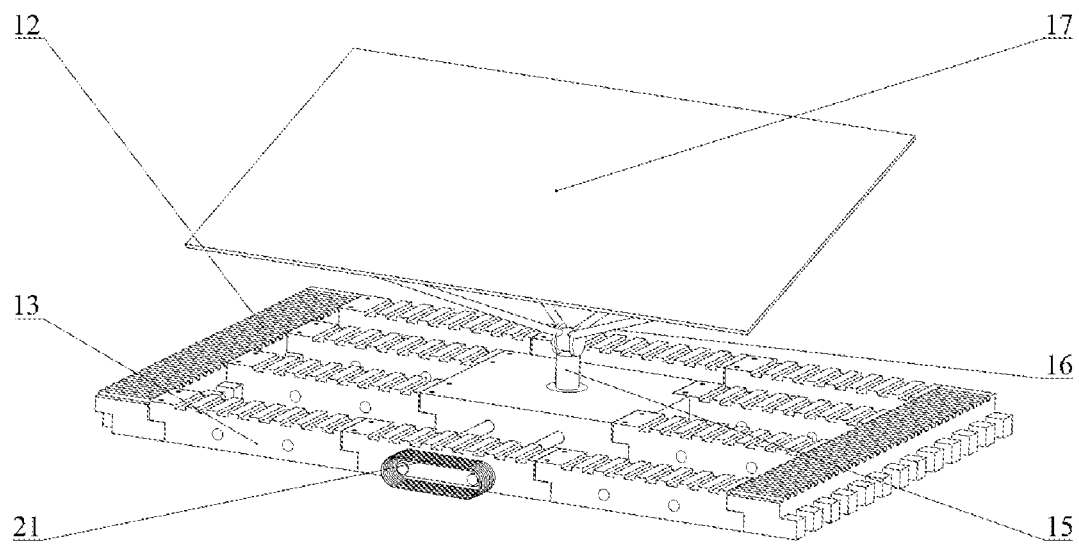
FIG. 4 is a resonance wave absorbing floating body unit of the present invention.
Figure 5:
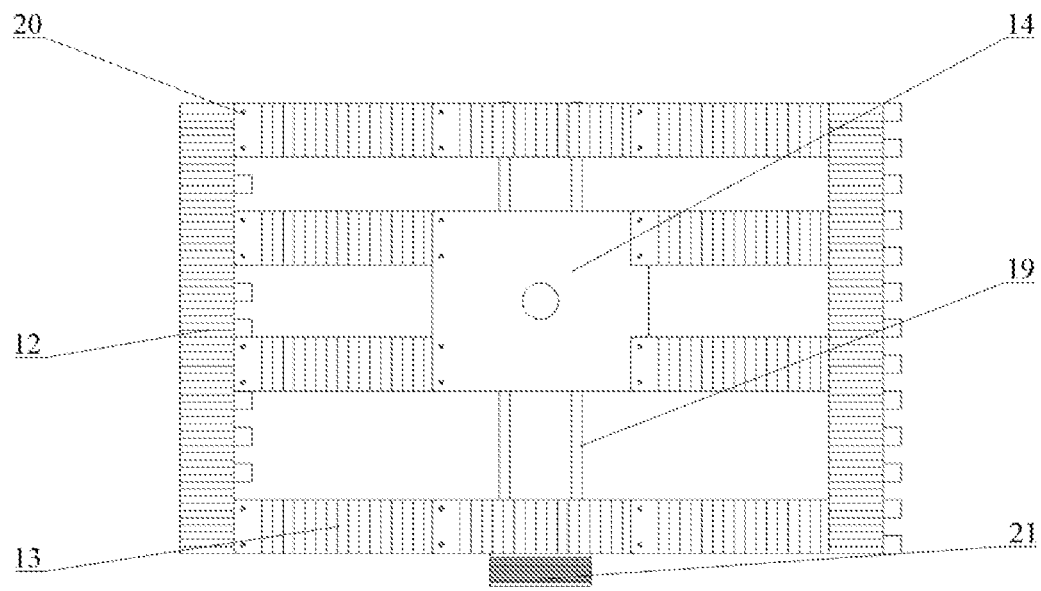
FIG. 5 is a top view of a resonance wave absorbing floating body unit of the present invention.

With reference to FIG. 4 and FIG. 5, the resonant wave absorbing floating body unit 3 is composed of a floating body module I, an umbrella-shaped photovoltaic support 16, a stand column 15 and a photovoltaic panel 17, and is arranged behind the breaking-wave base device. The umbrella-shaped photovoltaic support 16 is used for supporting the whole solar photovoltaic panel 17, use of the umbrella-shaped photovoltaic support 16 may avoid damage to the photovoltaic panel caused by deformation of the floating body module under sea waves or impacts, and a hinged structure is formed between a bottom of the umbrella-shaped photovoltaic support 16 and the stand column 15. An angle of the photovoltaic panel may be adjusted as required so as to achieve the maximum power generation efficiency.

The floating body module I includes walkway floating bodies I 12, walkway floating bodies II 13 and a rectangular floating body 14, where two ends of the rectangular floating body 14 are connected to the walkway floating bodies I 12 respectively at the two ends by means of the walkway floating bodies II 13, the walkway floating bodies I 12 are longer than any side of the rectangular floating body 14 and are longer than the walkway floating bodies II 13, and the walkway floating bodies I 12 arranged at the two ends of the rectangular floating body 14 are connected by means of a plurality of walkway floating bodies II 13 connected together. Distances between the walkway floating bodies I, the walkway floating bodies II and the rectangular floating body are adjusted within the range of an arranged sea area wave axis to form an array type narrow slit structure.

When waves enter narrow slits, the floating body module I of the array type narrow slit structure induces water in the narrow slits to generate piston-type up-and-down oscillation motion, such that an interference resonance phenomenon is generated, partial wave energy is dissipated, and a transmitted wave height of the wave shielding face is further reduced. For this end, narrow slits with different widths are spliced on each floating body module I. Waves in different periods generate resonance only under narrow slits with a certain width, and therefore, the width of the narrow slits of each floating body module I is adjusted, then, the floating body modules I with narrow slits of different widths are connected together, and many narrow slits of different widths are formed to cope with the waves in different periods.

Each floating body module I is provided with a corresponding bayonet, all the floating body modules I may be spliced together like splicing building blocks, and then are simply fixed by using plastic screws 20 so as to improve the strength thereof, and the plastic screws 20 may effectively prevent corrosion of seawater. In order to further improve the strength of the whole structure, two connecting pipes 19 penetrate the whole structure, and the connecting pipes 19 penetrate the rectangular floating body 14 and are connected to the walkway floating bodies II 13.

Figure 6:
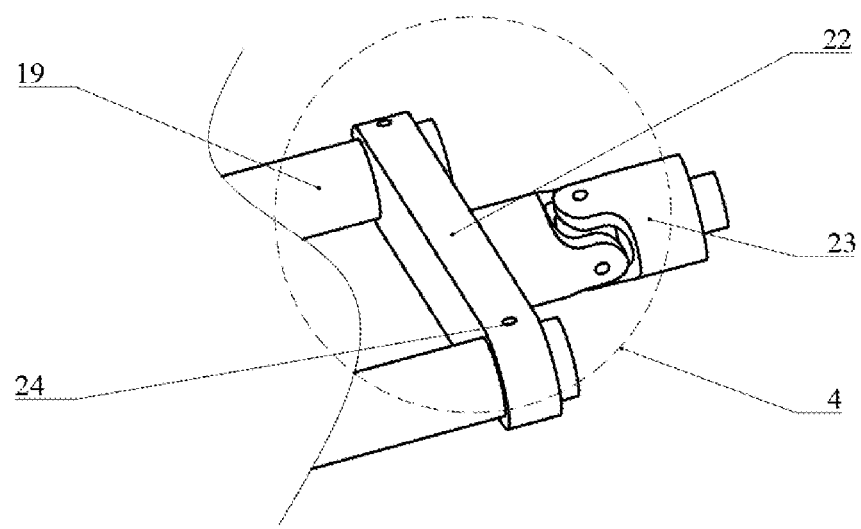
FIG. 6 is an axial diagram of a rope type connecting structure of the present invention.

With reference to FIG. 6, the universal joint type connector 4 is connected to the connecting pipe 19, and the universal joint type connector 4 includes a connection head 22, a universal joint 23 and an elastic rubber sleeve 21, where the connection head 22 is connected to the connecting pipe 19 by means of a fixing pin 24, the universal joint 23 is connected to the connection head 22, and a periphery of the universal joint 23 is provided with the elastic rubber sleeve 21 in a sleeving manner, which may protect the connecting structure from being corroded by seawater and has a good anti-collision effect.

The front and rear adjacent resonance wave absorbing floating body units 3 are flexibly connected by means of the universal joint type connectors 4, such that the degree of freedom of the previous resonance wave absorbing floating body unit 3 may be released, and stress of the resonance wave absorbing floating body unit 3 is reduced.

Figure 7:
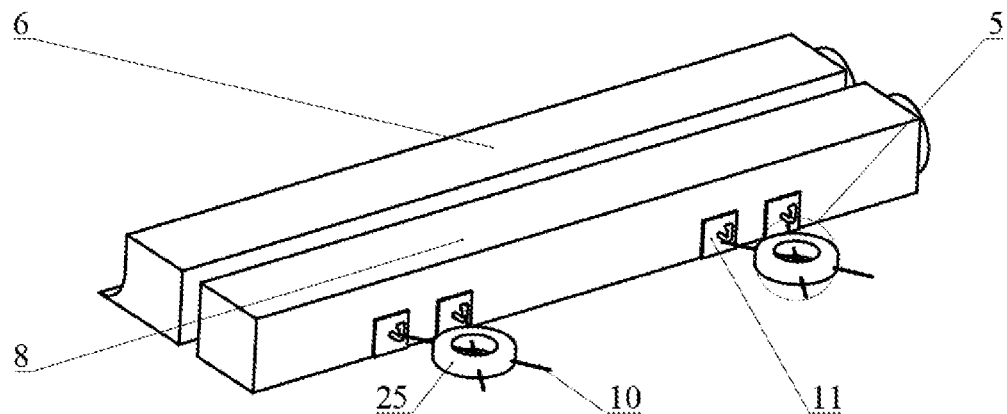
FIG. 7 is an axial diagram of a universal joint type connecting structure of the present invention.

With reference to FIG. 3 and FIG. 7, the rubber ring type connector 5 includes a rubber ring 25, ropes 10 and a mooring pile 11, where the mooring pile 11 is mounted on an end face of the common wave dissipating floating body 8, one end of the rubber ring 25 is connected to the mooring pile 11 by means of at least two ropes 10, and the other end of the rubber ring is connected to the resonance wave dissipating floating body unit 3 by means of at least two ropes 10.

Figure 8:
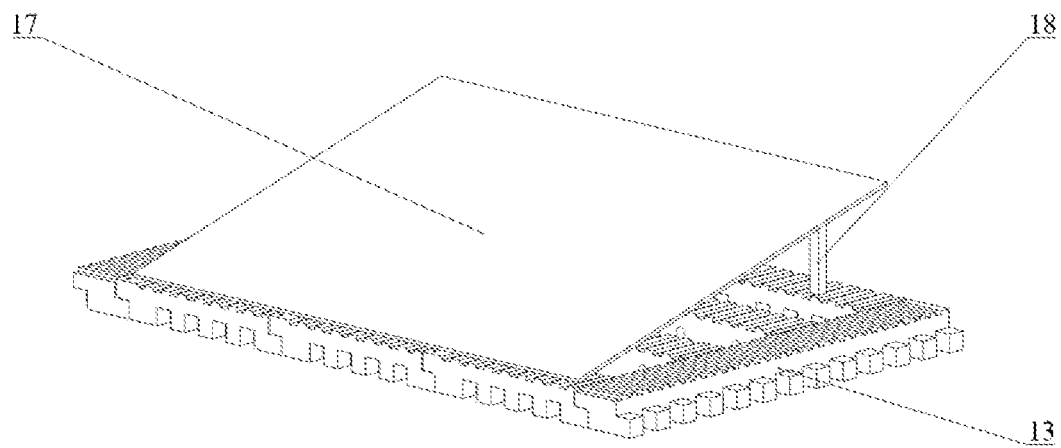
FIG. 8 is a common floating body unit of the present invention; and in the figures: breaking-wave base device—1, mooring unit—2, resonance wave absorbing floating body unit—3, universal joint type connector—4, rubber ring type connector—5, guided wave crushing type breaking-wave base device—6, common floating body unit—7, common wave dissipating floating body—8, anti-collision gasket—9, rope—10, mooring pile—11, walkway floating body I—12, walkway floating body II—13, rectangular floating body—14, stand column—15, umbrella-shaped photovoltaic support—16, photovoltaic panel—17, common mounting support—18, connecting pipe—19, plastic screw—20, elastic rubber sleeve—21, connection head—22, universal joint—23, fixing pin—24, and rubber ring—25.

With reference to FIG. 8, the common floating body unit 7 includes a floating body module II, a common mounting support 18 and a photovoltaic panel 17, compared with the floating body module I, a connecting pipe 19 for improving the overall structural strength is omitted in the floating body module II, the remaining structures are the same as those of the floating module I, and the photovoltaic panel 17 is mounted on the floating body module II by means of the common mounting support 18.

When the example is in operation, the device is limited on the sea surface by means of the mooring unit 2. When wind waves rush to the wave facing face of the device, namely, the breaking-wave base device 1, the wave guide plate in the front of the breaking-wave base 6 in the breaking-wave base device 1 may guide the sea waves to be ejected upwards to dissipate the energy of the sea waves, and when the sea conditions are relatively harsh, the rear common wave dissipating floating body 8 may be further added to improve the wave absorbing capacity of the breaking-wave base device 1.

A plurality of rows of wholes composed of resonance wave absorbing floating body units 3 are arranged behind the common wave dissipating floating body 8, the photovoltaic panel 17 is arranged in each resonance wave absorbing floating body unit 3, and the photovoltaic panel 17 is supported in the resonance wave absorbing floating body unit 3 by means of the umbrella-shaped photovoltaic support 16, such that damage to the photovoltaic panel caused by deformation of the floating body module under sea waves or impacts may be avoided. Moreover, a hinged structure is arranged between a bottom of the umbrella-shaped photovoltaic support 16 and the stand column 15, and an angle of the photovoltaic panel may be adjust as required so as to achieve the maximum power generation efficiency.

The floating body module I is arranged at the bottom of each resonance wave absorbing floating body unit 3, the floating body module I is formed by splicing two walkway floating bodies I, ten walkway floating bodies II and one rectangular floating body, and two connecting pipes 19 are used for penetrating the whole structure to further strengthen the integral strength. Distances between the walkway floating bodies I, the walkway floating bodies II and the rectangular floating body are adjusted within the range of the arranged sea area wave axis to form the array type narrow slit structure. When waves enter the narrow slits, the floating body module I of the array type narrow slit structure induces the water in the narrow slits to generate piston-type up-and-down oscillation motion, such that an interference resonance phenomenon is generated, partial wave energy is dissipated, and the transmitted wave height of the wave shielding face is reduced. For this end, narrow slits with different widths are spliced on each floating body module I. Since waves in different periods generate resonance only under narrow slits with a certain width, the width of the narrow slits of each floating body module I is adjusted, then, the floating body modules I with narrow slits of different widths are connected together, and many narrow slits of different widths are formed to cope with the waves in different periods.

The front and rear rows of adjacent resonance wave absorbing floating body units 3 are flexibly connected by means of the universal joint type connectors 4, such that the degree of freedom of the previous resonance wave absorbing floating body unit 3 may be released, and stress of the resonance wave absorbing floating body unit 3 is reduced.

Since the common floating body units 7 are arranged on the wave shielding face of the device, waves faced by the common floating body units are reduced, and therefore, the connecting pipe 19 for strengthening the structure is omitted. The common floating body units 7 are also directly connected together without connectors. Moreover, since the waves at the rear portion are further attenuated, umbrella-shaped mounting supports are 16 not used for mounting of the photovoltaic panels 17 on the common floating body units 7, and the common mounting supports 18 are used, such that the cost is low, and mounting is fast.

According to the present application, the breaking-wave base device is arranged on the wave facing face of the floating photovoltaic array, such that the defect that floating photovoltaic power generation has high requirements on sea conditions is overcome. Good wave absorbing performance of the breaking-wave base device is utilized to resist impacts of sea waves and weaken sea wave energy, a plurality of common wave dissipating floating bodies may be connected behind the breaking-wave base device, and the number of common wave dissipating floating bodies behind may be arbitrarily increased or reduced according to the sea conditions. Moreover, in the present application, the floating body modules I in the resonance wave absorbing floating body units employ the array type narrow slit structures, and when the waves enter the narrow slits, the water in the narrow slits is induced to generate the piston-type up-and-down oscillation motion, such that the interference resonance phenomenon is generated, the partial wave energy is dissipated, and the transmitted wave height of the wave shielding face is reduced. The resonance wave absorbing floating body units may adapt to various sea conditions by artificially adjusting the width of the narrow slits. The supports for supporting the photovoltaic panels on the resonance wave absorbing floating body units are of umbrella-shaped supporting structures, and a force bearing point on the rectangular floating body is only one, such that when the floating bodies deform under sea waves or impacts, the photovoltaic panels may be prevented from being stretched and damaged, and the angles of the photovoltaic panels are also convenient to adjust.

What is claimed is:

1. A wind-wave-resistant floating offshore photovoltaic device, comprising a photovoltaic array and a mooring unit, wherein the mooring unit used for limiting the position of the photovoltaic array is arranged on two sides and the head of the photovoltaic array, the photovoltaic array comprises a breaking-wave base device arranged on a wave facing face, resonance wave absorbing floating body units arranged in a middle and common floating body units arranged on a wave shielding face, a plurality of resonance wave absorbing floating body units are connected to form a resonance wave absorbing floating body that is connected to the breaking-wave base device, a plurality of common floating body units are connected to form a common floating body that is connected to the resonance wave absorbing floating body, the breaking-wave base device is connected to the resonance wave absorbing floating body by rubber ring connectors, and front and rear rows of resonance wave absorbing floating body units in the resonance wave absorbing floating body are connected by universal joint connectors.

2. The wind-wave-resistant floating offshore photovoltaic device according to claim 1, wherein the breaking-wave base device comprises a guided wave crushing breaking-wave base device arranged at a front end and a common wave dissipating floating body arranged at a rear end, and the common wave dissipating floating body is connected to the resonance wave dissipating floating body units by a plurality of rubber ring connectors.

3. The wind-wave-resistant floating offshore photovoltaic device according to claim 2, wherein a plurality of anti-collision gaskets used for preventing collision between the breaking-wave base device and the resonance wave absorbing floating body units are further arranged on an end face of the common wave dissipating floating body.

4. The wind wave-resistant floating offshore photovoltaic device according to claim 1, wherein each of the rubber ring connectors comprises a rubber ring, ropes and a mooring pile, the mooring pile is mounted on the end face of the common wave dissipating floating body, one end of the rubber ring is connected to the mooring pile via at least two ropes, and the other end of the rubber ring is connected to the resonance wave dissipating floating body unit via at least two ropes.

5. The wind-wave-resistant floating offshore photovoltaic device according to claim 1, wherein each of the resonance wave absorbing floating body units comprises a floating body module I, an umbrella-shaped photovoltaic support, a stand column and a photovoltaic panel, the stand column is arranged on the floating body module I, the umbrella-shaped photovoltaic support is arranged at an upper end of the stand column, and the photovoltaic panel is linked to the umbrella-shaped photovoltaic support;

the floating body module I comprises walkway floating bodies I, walkway floating bodies II and a rectangular floating body, two ends of the rectangular floating body are connected to the walkway floating bodies I respectively at the two ends by means of the walkway floating bodies II, the walkway floating bodies I are longer than any side of the rectangular floating body and are longer than the walkway floating bodies II, and the walkway floating bodies I arranged at the two ends of the rectangular floating body are connected by means of a plurality of walkway floating bodies II connected together; and a connecting pipe is arranged in the floating body module I, and the connecting pipe penetrates the rectangular floating body and is connected to the walkway floating bodies II.

6. The wind-wave-resistant floating offshore photovoltaic device according to claim 5, wherein each floating body module I is provided with a bayonet, all the floating body modules are spliced together by means of the bayonets, and plastic screws are used for achieving fixing between the walkway floating bodies I and the walkway floating bodies II, and fixing between the walkway floating bodies II and the rectangular floating body in the floating body module I.

7. The wind-wave-resistant floating offshore photovoltaic device according to claim 5, wherein the stand column and the umbrella-shaped photovoltaic support are connected by using a hinged structure.

8. The wind-wave-resistant floating offshore photovoltaic device according to claim 5, wherein distances between the walkway floating bodies I, the walkway floating bodies II and the rectangular floating body are adjusted within the range of an arranged sea area wave axis to form an array narrow slit structure.

9. The wind-wave-resistant floating offshore photovoltaic device according to claim 1, wherein the universal joint connectors are connected to the connecting pipe; and each of the universal joint connectors comprises a connection head, a universal joint and an elastic rubber sleeve, the connection head is connected to the connecting pipe via a fixing pin, the universal joint is connected to the connection head, and a periphery of the universal joint is provided with the elastic rubber sleeve in a sleeving manner, which can protect the connecting structure from being corroded by seawater.

10. The wind-wave-resistant floating offshore photovoltaic device according to claim 1, wherein each of the common floating body units comprises a floating body module II, a common mounting support and a photovoltaic panel, compared with the floating body module I, a connecting pipe for improving the overall structural strength is omitted in the floating body module II, the remaining structures are the same as those of the floating body module I, and the photovoltaic panel is mounted on the floating body module II by means of the common mounting support.

11. The wind-wave-resistant floating offshore photovoltaic device according to claim 1, wherein the plurality of the common floating body units are directly spliced.

\* \* \* \* \*